United States Patent [19]

Hirschfeld

[11] 3,907,437
[45] Sept. 23, 1975

[54] CELL CLASSIFICATION SYSTEM
[75] Inventor: Tomas Hirschfeld, Framingham, Mass.
[73] Assignee: Block Engineering, Inc., Cambridge, Mass.
[22] Filed: Apr. 26, 1973
[21] Appl. No.: 354,747

[52] U.S. Cl. ............... 356/156; 250/565; 250/573; 356/39; 356/204
[51] Int. Cl. .......................................... G01n 21/22
[58] Field of Search ............ 356/39, 102, 103, 104, 356/201, 156, 168, 204–206; 250/573, 565

[56] References Cited
UNITED STATES PATENTS
3,699,336  10/1972  Ehrlich et al. .................... 356/39 X
3,710,933   1/1973  Fulwyler et al. .................. 356/39 X
3,770,349  11/1973  Legorreta-Sanchez ........... 359/39 X Primary Examiner—Ronald L. Wibert
Assistant Examiner—F. L. Evans
Attorney, Agent, or Firm—Schiller & Pandiscio

[57] ABSTRACT

A system for differentiating among biological cells by determining the shape of the cell nuclei compared to a sphere. The nuclei are dyed and measurement is made of the transmission through the nuclei of the cells of radiation to which the nuclei are optically dense. The number of cells corresponding to each of several different degrees of transmission is then counted.

12 Claims, 6 Drawing Figures

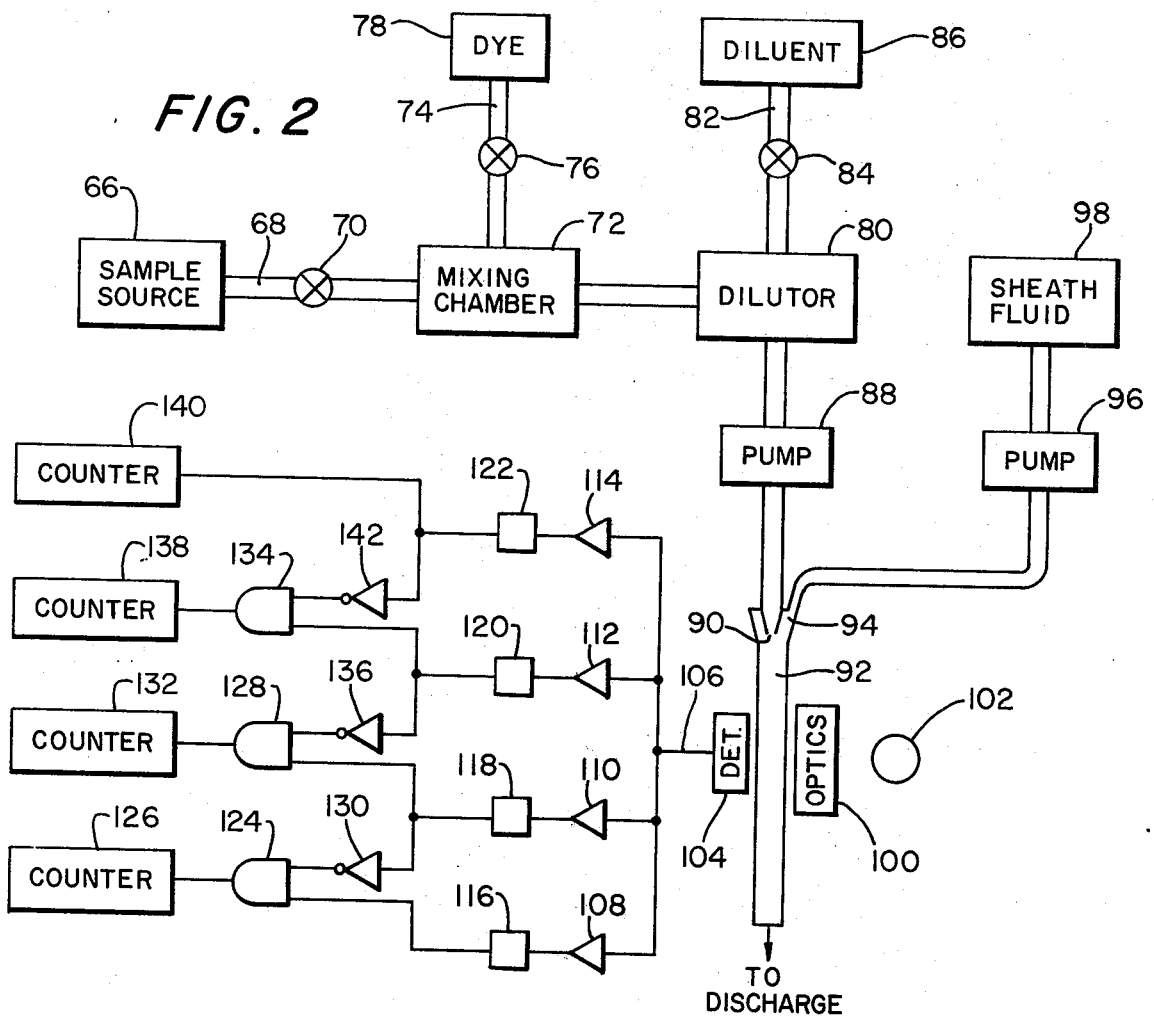
FIG. 2
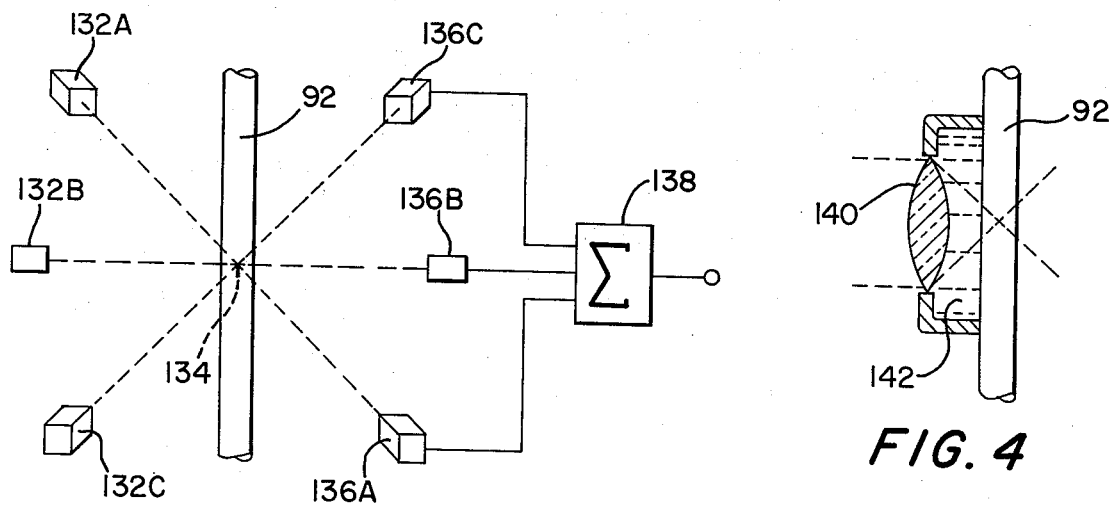
FIG. 3
FIG. 4

CELL CLASSIFICATION SYSTEM

This invention relates to pattern recognition and more particularly to apparatus for and methods of determining the classification of cells.

The classification of a population of cells is usually based upon five visual parameters determined microscopically; the color, size and shape of the cell nucleus after appropriate staining, and the color and size of stained cytoplasm. While the technique provides quite good classification, its use in, for instance, pathology is usually limited to a sample population of a few hundred cells. Despite its high degree of redundancy in cell identification, the technique can nevertheless be in serious error, because a limited population may not provide a statistically reliable sampling.

Considerable efforts have been made to provide apparatus that will automatically recognize the same parameters employed by the pathologists. For example, a number of systems employ electronic image tubes with computers to achieve pattern recognition. However, such systems invariably require a very large number of resolution elements with a commensurately sized computer memory, and are therefore usually very expensive and often bulky and complex.

A number of automatic cell classification systems use non-imaging techniques in which the classification methods are based typically on size only or on color only. However, in such devices, the random orientation of cells leads to severe difficulties in size measurement and thus tends to introduce serious inaccuracies in cell classification. One system has attempted to obviate some of these problems by using staining techniques which are highly selective to the enzymes of particular types of cells, but it requires both the use of live cells which are both genetically and metabolically normal. This technique must therefore miss some interesting, diagonstically significant cells with abnormal pathology. Further, this enzymestain technique has a non-direct relation to standard methods and therefore may not be acceptable to many pathologists.

Differential counting of the various corpuscular components of blood by automatic methods has heretofore been encumbered by a number of other difficulties. For example, the several categories, into which white corpuscles are normally classified are to some extent arbitrary, in that many cell characteristics vary in a continuum. Considerable judgment is thus needed to classify some borderline cells. These classifications often become less definite in case of disease, precisely when exact analysis is most likely to be required. Furthermore, many diseases may lead to the appearance of a variety of unusual types of corpuscles, creating a picture whose complexity seems to demand intervention of a human operant in the classification process.

If unfractionated blood is used, very large numbers of particles must be counted in order to count the rarer blood corpuscles with some accuracy. If fractionation is used, the reliability of the procedure, both in rejection of the particles discriminated against and in recovery of those selected, will not be total. This becomes even more severe in pathological conditions.

A principal object of the present invention is therefore to provide a novel system for classifying cells on the basis of their nuclear shape. Another object of the invention is to provide a non-imaging measurement of nuclear shape. Yet another object of the present invention is to provide such a non-imaging measurement of nuclear shape wherein data is preprocessed so that the use of large computers is avoided.

A further object of the present invention is to provide such a system wherein a shape factor of a cell nucleus is determined from a single measurement.

Yet other objects of the invention will in part be obvious and will in part appear hereinafter. The invention accordingly comprises the apparatus possessing the construction, combination of elements and arrangement of parts, and the method comprising the several steps and relation of one or more of such steps with respect to each of the others, all of which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 2 is a block and schematic diagram of a system for classifying cells in a flow stream;

FIG. 3 is a schematic diagram showing an exemplary optical system useful in part of the system of FIG. 2;

FIG. 4 is a schematic elevational diagram partly in cross section, showing a fragment of a preferred optical system useful in part of the system in FIG. 2, and;

Figure 1:
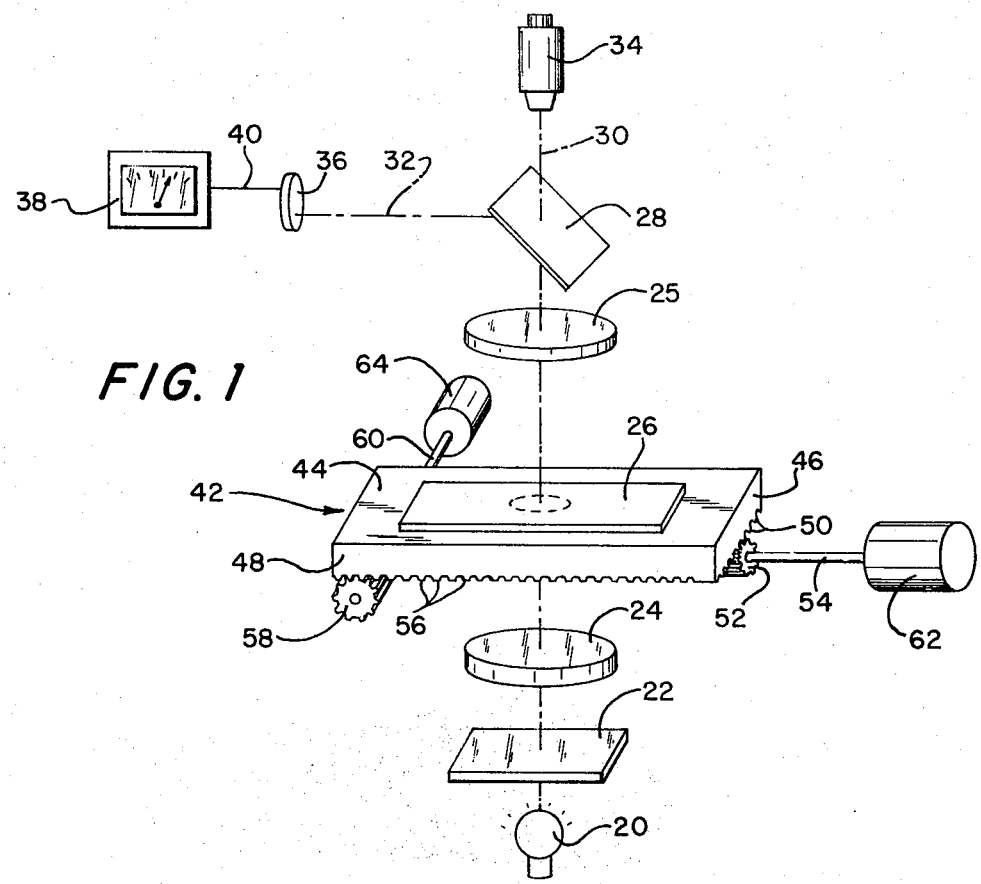
FIG. 1 is a block and schematic diagram of a system for classifying cells which are fixed in place relative to one another.

In a co-pending application, Ser. No. 280,271, filed Aug. 14, 1972, a system comprising means for substantially simultaneously measuring the magnitudes of two different shape-dependent functions of the cell or its nucleus and means for determining a relationship between the magnitudes was disclosed. For example, the property of sphericity can be considered to be the desired shape factor, although clearly sphericity is but one example of any arbitrary solid shape that can be chosen. However, the choice of a sphere permits simplification of exposition here and simplifies computations.

For a perfect sphere, there are a number of different shape dependent functions, typically the surface area (A), the volume (V), the mean cross-sectional area (S) and the mean thickness (T). These are:

$$A = \pi d^2; \tag{1}$$

$$V = \frac{\pi d^3}{6}, \tag{2}$$

$$S = \frac{\pi d^2}{2}, \text{ and} \tag{3}$$

$$T = \frac{\pi 2}{3} d \tag{4}$$

where $d$ is the spherical diameter.

The term "function" as used herein is intended to be interpreted in the mathematical sense to mean a variable, the value or magnitude of which is determined by a second variable. The term "different functions" is intended then to mean a plurality of functions wherein the laws of dependence on the second variables are different.

The relationship between any two of these shape dependent functions can be expressed by a ratio $$\frac{[f(d)]^n}{[\phi(d)]^m} = \gamma$$

where $n$ and $m$ are exponents selected so that $d$, which is size dependent primarily, vanishes. Thus, for example, if $f(d)$ is V, $\phi(d)$ is S, $m = 1$ and $n = \frac{2}{3}$, the shape factor $\gamma$ for a cellular nucleus having a perfectly spherical shape will be a readily computed limit quite independent of the value of d. Any departures measured from such limit are measure of variation of the shape of the nucleus from the arbitrary solid shape or sphericity and hence a determination of an aspect of shape. It will readily be seen that, for example, where $f(d)$ is V and $\phi(d)$ is T, by selecting $m = 1$ and $n = \frac{1}{3}$, the shape factor $\gamma$ will again have a readily computed limit representing a sphere, and will vary according to departures from sphericity.

It will be appreciated that these functions may be measured in a number of ways. For instance, a magnitude which is proportional to the volume of a cell nucleus can be obtained by measuring fluorescent re-emission of light absorbed by the nuclear DNA (or otherwise measuring the nucleus at an optically thin wavelength) while a magnitude related to the nuclear surface area can be obtained by measuring the light scattering from the nucleus. Given such measurements, means can be provided for then determining a shape factor which is proportional to a ratio of the volumetrically related magnitude to the surface related magnitude.

As another example, the two magnitudes measured can be related to the apparent thickness and the volume of a cell nucleus, and a shape factor is obtained from a ratio of these two functions. Measurement here can be achieved from light absorption or by fluorescent re-emission. The effective thickness is measured by examining the self-shadowing reduction in the measured volume at wavelengths where the particle is optically thick. Such reduction arises from the non-linearity of the transmission-thickness relationship. Details of such systems have been described in the above referenced application.

The independent measurement of a volume dependent magnitude can be neglected in many cases, however. Within a species, and neglecting mitotic cells, the nuclei of similar normal cells each possess the same amount of DNA (desoxyribonucleic acid). Thus, the product of DNA concentration and nuclear volume is a constant for the vast majority of single cells, and if the measurement of any of the other shape-dependent functions (which are not solely dependent on volume) is undertaken in such a way as to include a factor proportional to concentration, such a measure by itself can serve as a measure of shape. The effective thickness, measured radiometrically at a wavelength where DNA is optically thick, includes just such a factor, and under appropriate conditions, can serve as a measure of shape. It will be appreciated that the use of such a single-measurement shape factor greatly reduces the complexity of an automated classification system. Of course, an independent measure of nuclear volume may still be desirable as a check for abnormal or mitotic cells.

An alternate way of considering the principal underlying the present invention is to note that the transmission characteristics of the nucleus of a cell is not simply determined by the absorption characteristics of DNA. Not only is the amount of DNA important, but the distribution in terms of both shape and orientation of the DNA with respect to the transmitted light beam also affect the transmission. When the amount of DNA is substantially constant, and when steps are taken to remove the effects of orientation, variations in the strength of the transmitted signal are a measure of the variation in shape of the nucleus.

The concept of optical thickness can be described as follows: Lambert's Law (also known as Bouguer's Law) states:

$$I_x = I_o e^{-\alpha x}$$

where $I_o$ being the radiant intensity at some point zero, $I_x$ being the radiant intensity at some point removed by the distance $x$ from point zero, e being the natural base and $\alpha$ being the coefficient of absorption in the intervening medium between points zero and $x$.

It is known that the foregoing exponential equation can be expressed as a series expansion in which the first two terms are linear. For small values of the product $\alpha x$, the linear terms of the series expansion are a good approximation of the value of $I_x$, i.e. the transmission changes substantially linearly with changes in $x$. In such case, the intervening medium is considered to be "optically thin". However, where the value of the product $\alpha x$ is so great that the linear approximation is no longer close, but one must add in one or more known linear terms in the series, to obtain a close approximation then the intervening medium is considered to be "optically thick". The present invention is concerned with the transmission of radiation through nuclei which are optically thick with respect to the particular several wave lengths chose, i.e. the transmission changes exponentially, not linearly, with changes in nuclear thickness.

The present invention will be described, by way of example, with reference to the differentiation between band cells and segmented granulocytes in a population thereof. It is known that as a band cell ages its nucleus will subdivide. For example, the progressive segmentation to a usual maximum of five segments is characteristic of the segmented neutrophilic granulocyte; eosinophilic and basophilic segmented granulocytes usually have fewer segments. Because segmentation is a sign of advanced cell age, the ratio between band and segmented granulocytes is frequently of substantial diagnostic importance. Yet, differentiation between these two types of cells can be difficult, even for a trained pathologist, because the nuclear morphology tends to be obscured by the cytoplasmic granules and by the orientation of the nucleus.

Referring now to FIG. 1 there is shown a system primarily manually operable, embodying the present invention for differentiating between morphologically different biological cell nuclei in a population taken from the same individual. The system of FIG. 1 is intended to make observations of cells which have been fixed spatially with respect to one another.

The system of FIG. 1 includes a radiation source 20 and an optical system, essentially filter 22 and lens 24 disposed adjacent one side of sample slide 26. Filter 22 is selected to transmit a selected range of wavelengths from source 20. Source 20 and lens 24 are positioned so that radiation from source 20 is focused to a spot at sample slide 26.

Disposed on the opposite side of sample slide 26 is a lens 25, also focused on the sample slide. Light from this lens 25 is directed toward beam splitting means 28, which is capable of diverting radiation transmitted through sample cell 26 into two paths 30 and 32. Viewing means such as microscope ocular 34 is disposed across path 30, and photo-electric detector 36 is disposed across path 32. Meter 38 is coupled to detector 36 through line 40 to provide a reading with respect to the output radiation from sample slide 26.

Slide 26 is supported on a movable carriage of known type indicated generally at 42. Carriage 42 comprises flat plate 44 having depending sides 46 and 48. The lower surface of depending side 46 has teeth 50 formed therein to mesh with geared wheel 52 pivotally mounted on the bottom of plate 44 to one end of shaft 54. Similarly, the lower surface of depending side 48 has teeth 56 formed therein to mesh with geared wheel 58 pivotally mounted on the bottom of plate 44 to one end of a shaft 60. Shafts 54 and 60 are in turn pivotally mounted in suitable supports (not shown). Handwheels 62 and 64 are mounted to the opposite ends of shafts 54 and 60, respectively. As will be understood, rotation of handwheels 62 and 64 causes plate 44 to move axially with respect to shafts 54 and 60, respectively, and hence sample slide 26 can be moved back and forth, and side to side, so that individual cells may be examined as will be described in detail herein after.

Referring now to FIG. 2, there is shown a system intended to make automatic observations of cells transiting an observation point in a flow stream. This system includes source 66 of a sample of cells which is connectable through conduit 68 and valve 70 to a mixing chamber 72. The latter also is connectable through conduit 74 and valve 76 to supply 78 of a dye or stain bath. The output of chamber 72 is connected as one input to dilution chamber 80. Another input to chamber 80 is connectable through conduit 82 and valve 84 to supply 86 of diluent fluid.

The diluent from supply 86 is preferably selected (and metered by valve 84) to provide a number of basic qualities for purposes of this invention. The diluent should, when added in metered proportion to the stained cell suspension from chamber 72, provide matching of the indices of refraction of the cell cytoplasm and the mixed fluids; because it is highly desirable to maintain substantially laminar flow through the flowcell at a high rate of flow, the diluent should also be selected so that, when added in metered proportion to the cell suspension, it will adjust the fluid viscosity to permit high speed laminar flow. The diluent also should be selected so that, when added to the cell suspension it will attain an optimum osmotic pressure with respect to the cells to maintain their stability. In some instances, pumps may be provided to yield the high rate of flow through the flow cell. In such case, the diluent may also serve to adjust osmotic pressure and thereby compensate for the high static pressure caused by the pumps.

The fluid output from dilution chamber 80 is connected to pump 88, and the output of the latter in turn is connected preferably to a central injector nozzle 90 of a sheathed-stream flow cell 92. The latter typically can be of the design disclosed in *Nature*, Jan. 3, 1953, p. 37, in the article by P. Crosland-Taylor entitled "A Device for Counting Small Particles suspended in a Fluid through a Tube". The annular space 94 around central injector 90 is connected to the output of second pump 96. The input to the latter is connected to a supply 98 of sheath fluid. Injector 90 and space 94 are disposed at one end of flow cell 92, the remainder of the latter being essentially a tube or other elongated enclosed flow channel having an optically transparent portion.

In operation, in the fluid flow portion of the system thus described, the sample of cells suspended in a fluid is first mixed in chamber 72 with a concentrated dye solution from supply 78. The sample is then diluted in chamber 80 with diluent from supply 86 to provide adequate separation between cells in flow cell 92, and to reduce the solution concentration of dye so that the concentration of dye in the fluid carrier is many times smaller than the dye concentration on a typical cell.

The diluted sample is next pumped by pump 88 through injector 90 into the measuring flowcell 92. The sample stream is confined by a fluid sheath provided by pump 96 of liquid from supply 98 in order to obtain a narrow, rapidly flowing sample stream.

As noted, flow cell 92 is constructed so that fluid is introduced in one stream through injector nozzle 90 and in an annular stream, surrounding the first stream, by pump 96 into annular space 94. The velocities of the central sample stream and the annular or sheath stream are controlled such that laminar flow conditions are established at the junction of the two streams, hence the two streams will move together with the sheath stream effectively constricting the sample stream. The sheath fluid provided from source or supply 98 preferably is selected to provide the requisite viscosity which will permit laminar flow under the head pressure provided by pump 96. It should also be selected so that there is close matching of refractive indices between the sheath and sample fluids.

The diluent from supply 86 and the sheath fluid 98 may be the same if desired although the requirements for the two need not be identical. For example, it is desirable to control carefully the refractice index and/or viscosity of both of the fluids, as well as the osmotic pressure produced across the surface of sample cells which may be suspended in or associated with the fluids. To these ends, the fluids are preferably aqueous solutions containing both additives which are polymeric and additives which are salts. The control of refractive index is established by adjusting the concentration of the polymer in the solution. For a given concentration of polymer, the viscosity of the fluid can be adjusted by selecting an appropriate degree of polymerization (i.e. the average molecular weight of the polymer) which parameter has relatively little effect on refractive index. Lastly, the polymer will have little effect on osmotic pressure, so the fluid may include a complementary dissolved salt, the concentration of which will serve to adjust the osmotic pressure to some desired value.

Thus typical polymeric additives for use in the diluent and sheath fluids are polyethylene glycol and the like, and blood plasma extenders such as dextran, polyvinyl pyrrolidone and the like. Obviously the salt additive is usually and preferably simply NaCl.

The flow cell preferably has circular cross section and has the largest diameter adjacent the tip of injector nozzle 94, being tapered down stream from that point. To obtain a desirable center sample stream of 20 microns in diameter, typically the flow cell will be tapered down to an internal diameter of about 200 microns. By using such a flow cell the blood cells are transmitted along the central stream in single file at high speeds.

The flow cell thus described then essentially confines the blood cells to a narrow stream wherein the blood cells move each through a particular point substantially one at a time and therefore each can be examined in sequence. Further because the center stream confines the blood cells to a substantially axial flow, the latter motion of the blood cells is sharply limited and hence the cells will remain well within focus of an optical system. Thus the system of the invention includes an electro-optical subsystem which is shown schematically in FIG. 2. The subsystem preferably includes an optical device 100 such as lenses, mirrors and the like for illuminating separate portions of flow cell 92 with radiation a spectral source 102. Associated with optical device 100 is a detection device 104 for converting radiation from optical device 100 into an electrical signal.

Measurements for an optically thick absorber are usually orientation dependent, i.e. even if the radiation incident on the cell is of constant amplitude, the extent of transmission noted by the detector depends markedly on the spatial orientation of the nuclear components unless for example the latter are grouped symmetrically as a sphere.

In order to minimize orientation effects, the cell should be illuminated by a system from a number of different directions (referred to the cell itself or as seen by the cell) the system being arranged so that the sum of the signals corresponding to the observed cellular or nuclear cross-section is substantially independent of orientation, i.e. is substantially invariant. Ideally there are at least three such directions (ideally mutually orthogonal) at least 60° mutually separated from one another. Thus for example, in one embodiment shown in FIG. 3, source 100 of FIG. 2 is in the form of three individual radiation emitters 132A, 132B and 132C which are disposed to direct three corresponding radiation beams along mutually orthogonal paths to intersect at a common point 134 preferably disposed on the longitudinal axis of flowcell 92. Similarly, detector 104 is in the form of three detection devices 136A, 136B and 136C disposed to detect radiation transmitted respectively from emitter 132A, 132B and 132C by the nucleus of a cell located at point 134. The three detection devices, being adapted to provide electrical output signals responsively to radiation incident thereon, all have their output terminals connected to summing device 138. The signal from device 138, the sum of all the inputs, will be substantially invariant for a particular aggregate of particles of given shape and size located at point 134 regardless of the orientation of the particle of aggregate.

It will be apparent that the beams from emitters 132A, 132B, and 132C need not intersect but can illuminate successively a biological cell traversing flowcell 92 assuming that the orientation of that cell with respect to the sources does not materially change. In such case, the output signals from detection devices 136A, 136B and 136C can be suitably delayed or stored so as to be summed later.

Alternatively, one can provide means, such as a spiralled input channel to flowcell 92, for introducing a known rotation about one or more axes to biological cells traveling down the axis of the flowcell. In such case, if only one light source is used and is focussed to a sufficiently large spot the biological cell can at successive intervals see the light beam from at least two, and preferably three, mutually orthogonal directions. In such case a simple detector, responsive to correspondingly successive levels of radiation outputs from the biological cell will suffice to feed a device which ultimately will sum the successive signals.

It will be apparent that the systems just described eliminates variations due to random orientation only in the case of objects of simple geometry such as ellipsoids, cylinders, and the like. The less symmetric an object is, the more directions of illumination and of observation will be required to eliminate orientation effects substantially. In the limit, hemispheric illumination of the object, together with hemispheric collection of the radiation output, completely eliminates variations of the output due to orientation for even the most complex shape.

Thus, there is shown in FIG. 4 a system wherein the illumination provided is in the form of an illuminating cone approaching a 180° aperture. This can be achieved by providing, as optics 100 of FIG. 2 lens 140 at a very high aperture (e.g. >90°) and using immersion techniques whereby the interspace between the objective lens and the wall of the flowcell 92 is filled with fluid 142 having a high index of refraction (e.g. > 1), preferably matched to the index of refraction of the carrier fluid in flowcell 92. Cones in excess of 160° can be formed in this manner. For a wide angle illuminating cone of uniform radiance, the interaction between an absorber of arbitrary shape and the incoming radiation approaches orientation invariancy. This occurs because regardless of the absorber's position, the amount of light coming at it from a given relative angle of approach is always the same. Should the absorber rotate, a given angle of incidence contains different rays, but the total intensity of the bundle of rays should be constant. Obviously, a similar approach to hemispheric illumination can be applied to the embodiment of FIG. 1.

Referring again to FIG. 2, means are provided for reading the output signals of the detector and for separating the detector output signals into several groups according as the signal intensity is representative of the extent of transmission through the cell nucleus. To this end, the output signal from detection device 104 is transmitted on line 106. Line 106 is connected in parallel to the respective inputs of a group of segregating devices, such as threshold amplifiers 108, 110, 112 and 114 each set at a different threshold level. The output of these amplifier are respectively connected to the inputs of corresponding wave shaper or pulse generators such as one-shots 116, 118, 120 and 122. The output of one-shot 116 is connected to an input of AND gate 124, the output of which is connected to first counter 126. The output of one-shot 118 is connected to an input of AND gate 128 and also through inverter 130 to another input of gate 124. The output of gate 128 is connected to the input of second counter 132. The output of one-shot 120 is connected to one input of AND gate 134 and also through inverter 136 to another input of gate 128. The output of gate 134 is connected to the input of third counter 138. Lastly, the output of one-shot 122 is connected to the input of fourth counter 140 and also through inverter 142 to a second input to gate 134.

In operation of both of the electro-optical systems heretofore described, the nature of absorption (the inverse of transmission) of the nuclei of the cells of a sample is derived by determining the number of cells which exhibit different levels of radiation transmissions. Unstained DNA is known to show an absorption maximum in the ultraviolet near 260 m$\mu$. Thus, the cellular nuclei can be considered to be optically thick with respect to wavelengths at or closely adjacent this absorption maximum for DNA. However, it will also be appreciated that a substantial number of dyes are known which are specific to DNA and therefore can render the cell nuclei optically thick with respect to wavelengths at or near the absorption maxima of the dyes. To accomplish this, first the DNA in the nucleus of each of the cells is dyed. Dyeing and fixing of the cells on the slide of FIG. 1 is by any of the well-known standard techniques. Dyeing of the cells in the embodiment of FIG. 2 is of course achieved in mixing chamber 72 with a dye or stain from supply 78. The stained nuclei, whether the cell is fixed or mobile, are then irradiated preferably by substantially hemispheric illumination with wavelengths in a band to which the nuclei are optically dense. The transmission of each nucleus is then measured. In FIG. 1 this is accomplished by visually centering each cell in the illuminating beam and then reading off the output at meter 38. In the embodiment of FIG. 2, transmission measurement is accomplished automatically as the cells traverse flow cell 92, the change in transmission of the beam causing a corresponding change in the output of detection device 104.

The transmission characteristic of each nucleus is then assigned to a category according to its intensity, and the number of nuclei falling within that category is then determined. This is achieved by manual methods in connection with the embodiment of FIG. 1 and is done automatically in connection with the embodiment of FIG. 2. Particularly in the latter, if a signal is above the threshold of amplifier 108 but below the threshold of amplifier 110, then it is apparent that gate 124 is enabled because both inputs of gate 124 are high, and the pulse generated by one-shot 116 will be counted only in counter 126. If however, for example, the output from detection device 104 is at a level which is above the threshold levels both amplifiers 108 and 110 but below the threshold level of amplifiers 120 and 112 then the corresponding pulse from one-shot 118, being inverted, will inhibit gate 124 and also be applied as an input to gate 128. Because one-shot 120 however has not produced a signal, the output of inverter 136 will enable gate 128 so that the pulse from one-shot 118 will be counted in counter 132. It is apparent that the gating scheme here shown, which is merely exemplary, essentially categorizes the transmission characteristic of each nucleus according to an arbitrary reference range, the total in each category thus established being stored in bins or memories exemplified by counters. The identification of a cell is made by measuring or computing the transmission characteristic for an amount of DNA shaped as an arbitrary solid such as a sphere. By comparing the measurement obtained from the sphere with the value assigned to each category serves to identify each of the categories, i.e. provides a determination of the sphericity of each category. Alternatively, one need only obtain average measurements for a number of nuclei of pre-identified cells to provide a value against which the categories can be compared.

Figure 5A:
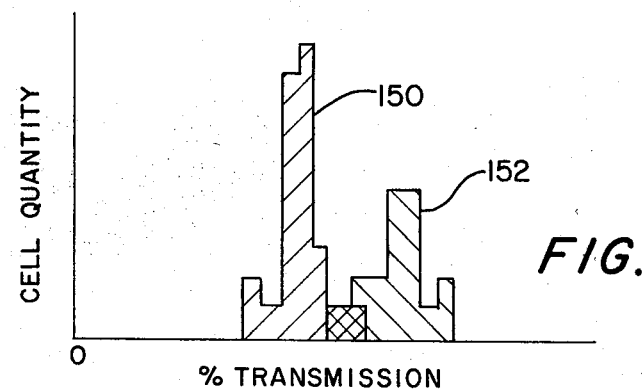
FIGS. 5A and 5B are histograms showing cell frequency as a function of transmissions.

As previously indicated, for cells which differ only in their nuclear shape, the transmission characteristics of the nucleus may be used as a measure of nuclear shape. This then permits differentiation between populations of particular type of cells according to a single measurement, i.e. the transmission characteristics of cell nuclei with respect to radiation to which the nuclei are optically dense. This statistical differentiation is shown graphically in FIG. 5A wherein the quantity of cells in each of several categories is plotted as in histogram against the percentage transmission. The cells in FIG. 5 were also identified by direct visual observation as a cross-check. It will be seen that segmented granulocytes were distributed as shown in the envelope, identified by reference numeral 150, embracing an area cross-hatched in a first direction. Band cells fell within the area cross-hatched in an opposite direction and enclosed within the envelope identified by reference numeral 152. All of the cells examined to make the histogram of FIG. 5A were stained and fixed on a slide so that the cell structure was essentially flattened.

Figure 5B:
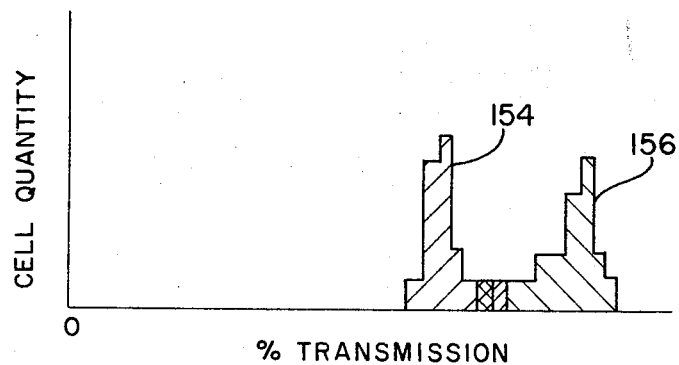

A similar statistical distribution is shown in FIG. 5B in which the envelope identified by reference numeral 154 enclosed the distribution of the segmented granulocytes observed in another sample, while the envelope identified by reference numeral 156 enclosed the distribution of all of the band cells identified in that sample. All of the cells in FIG. 5B were free-floating so that they each had a substantially spherical shape with a minimal amount of flattening. It will be seen that in comparing the histogram of FIGS. 5A and 5B, in both instances the two populations of cells are readily distinguished from one another in accordance simply on the basis of the percentage transmission, the shift of the populations from FIGS. 5B to 5A along the transmission axis being due to cell flattening and presumably therefore to a uniform bias or change in the nuclear configuration.

The method described above depends upon the constancy of nuclear DNA, and the ability to measure in a manner relatively independent of orientation, a shape dependent function, not solely proportional to volume which is linearly dependent upon DNA concentration. In the case where DNA concentration is relatively constant from cell to cell, then any shape-dependent function irreducible to volume may be used. It should also be noted that, in certain cases DNA concentration, rather than shape, may be used as the discriminant.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Method of determining the comparative shape of cell nuclei of a population of cells characterized in having the same mass of nuclear DNA in each cell, and comprising the steps of measuring for each of said nuclei the magnitude of a shape-dependent function other than volume, which is proportional to the concentration of DNA in said each of said nuclei, and comparing said magnitude with a differently determined value of said function for the same concentration of DNA, whereby to obtain from the comparison a value which is indicative of the shape of said nuclei.

2. Method as defined in claim 1 wherein said step of measuring comprises
directing onto said nuclei radiation to which said nuclei are optically thick and
determining the extent of absorption of said radiation by said nuclei in sequence.

3. Method as defined in claim 2 including the step of dyeing the cell nuclei before directing said radiation thereon and wherein said radiation has a wavelength at or near the absorption maxima of said dye.

4. Method as defined in claim 2 wherein said step of directing comprises directing said radiation onto said nulei so that the determination of absorption is substantially independent of orientation of said nuclei when irradiated.

5. Method as defined in claim 1 including counting the number of said nuclei for each of which the comparison of said magnitude with said value falls within a preselected range.

6. Method as defined in claim 1 wherein said value is determined as if said mass were in an arbitrarily selected shape.

7. Method as defined in claim 6 wherein said shape is a sphere.

8. Apparatus for determining the comparative shape of cell nuclei of a population of cells characterized in having the same mass of nuclear DNA in each cell said apparatus comprising in combination;
means for directing beam of radiation in a sequence at said nuclei;
means for measuring the magnitude of radiation consequently emitted by each of said nuclei so as to produce a series of signals of magnitude variable in proportion to the concentration of DNA in said each of said nuclei and dependent upon the shape of said nuclei; and
means for counting the number of said signals having magnitudes falling within each of a plurality of preselected ranges of values thereof.

9. Apparatus as defined in claim 8 including means for directing said radiation onto said nuclei from at least three different substantially mutually orthogonal directions.

10. Apparatus as defined in claim 8 including means for directing said radiation onto said nuclei approximately hemispherically.

11. Apparatus as defined in claim 9 including means for gathering substantially hemispherically radiation emitted from each of said nuclei as a consequence of radiation being directed onto said nuclei.

12. Apparatus as defined in claim 8 wherein said means for measuring comprises means for determining the optical thickness of said nuclei.

* * * * *